United States Patent [19]

Böhm et al.

[11] Patent Number: 5,503,026
[45] Date of Patent: Apr. 2, 1996

[54] METHOD AND APPARATUS FOR DETERMINING A VOLUME FLOW

[75] Inventors: Alfred Böhm, Viechtach; Andreas Geissler, Deggendorf, both of Germany

[73] Assignee: ULTRAKUST Electronic GmbH, Gotteszell, Germany

[21] Appl. No.: 248,000

[22] Filed: May 24, 1994

[30] Foreign Application Priority Data

May 25, 1993 [DE] Germany ............... 43 17 366.7

[51] Int. Cl.⁶ .................................................. G01F 1/58
[52] U.S. Cl. ................................................... 73/861.11
[58] Field of Search ........................ 73/861.11, 861.12, 73/861.13, 861.16, 198, 215, 227

[56] References Cited

U.S. PATENT DOCUMENTS

| | | | |
|---|---|---|---|
| 4,083,246 | 4/1978 | Marsh | 73/227 |
| 4,117,721 | 10/1978 | Suzuki et al. | 73/861.16 |
| 4,218,915 | 8/1980 | Torimaru | 73/861.16 |
| 4,480,466 | 11/1984 | Gates | 73/215 |
| 5,341,102 | 8/1994 | Akiyama et al. | 73/861.11 |

FOREIGN PATENT DOCUMENTS

| | | |
|---|---|---|
| 1498323 | 2/1969 | Germany . |
| 1291523 | 3/1969 | Germany . |
| 3737607 | 5/1989 | Germany . |
| 4108138 | 10/1991 | Germany . |
| 4243077 | 6/1993 | Germany . |

*Primary Examiner*—Richard Chilcot
*Assistant Examiner*—Harshad Patel
*Attorney, Agent, or Firm*—Keck, Mahin & Cate

[57] ABSTRACT

In a process for the determine ton of a volume flow a fluid is passed through a measuring line with a defined cross-section. In the measuring line the flow rate and the fill degree of the measuring line are determined and the volume flow is determined from the flow rate, the measuring line cross-section and fill degree. The determination of the flow rate and the fill degree takes place with a single measuring chamber at the same time and at the same location with respect to the axial extension of the measuring line.

14 Claims, 1 Drawing Sheet

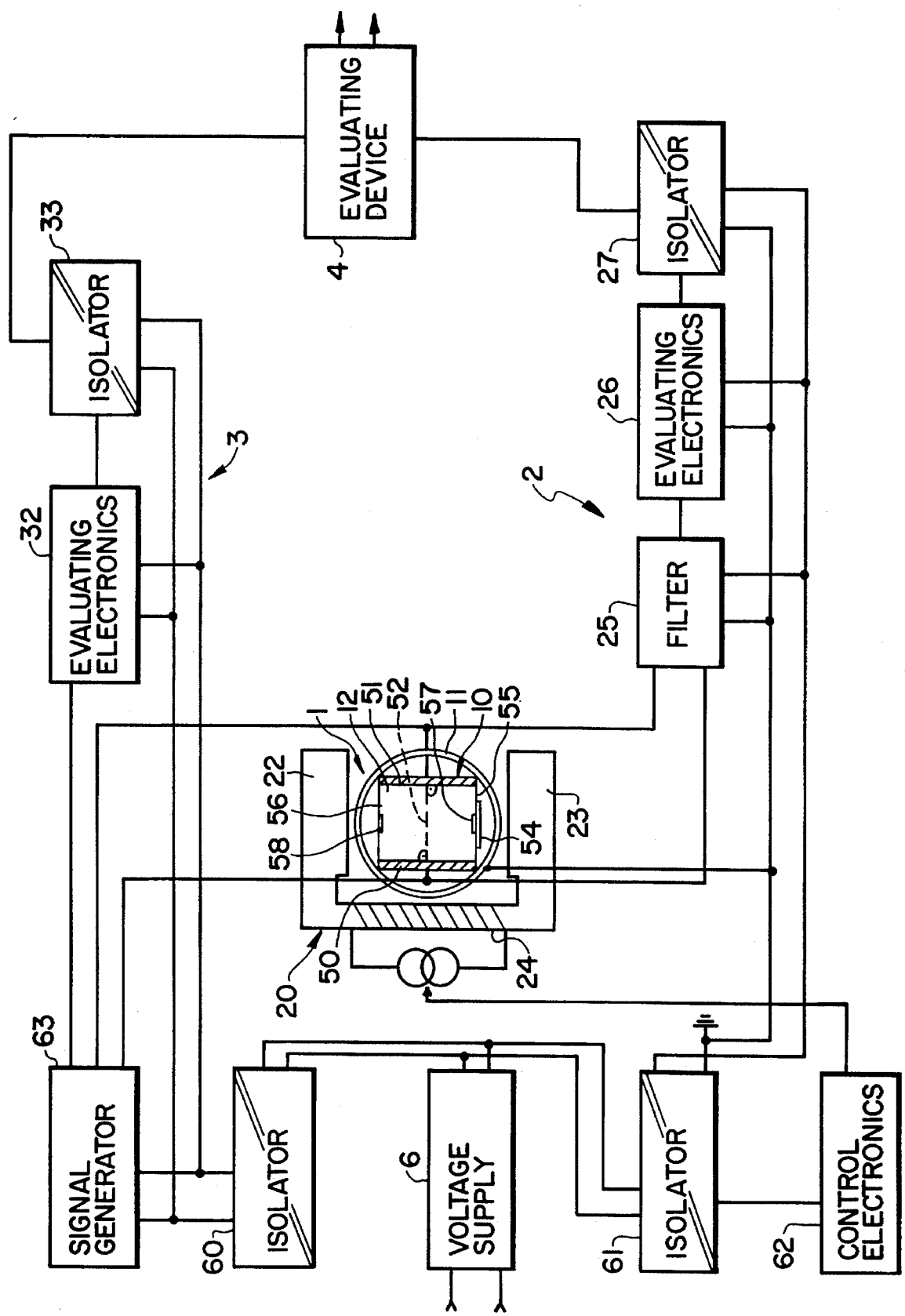

METHOD AND APPARATUS FOR DETERMINING A VOLUME FLOW

FIELD OF THE INVENTION

The invention relates to a method for determining a volume flow, in which a fluid is passed through a measuring line with a defined cross-section, in which the flow rate in the measuring line is determined, in which the degree of filling of the measuring line is determined and in which the volume flow is determined from the flow rate of the fluid, the cross-section of the measuring line and the degree of filling of the measuring line. Further the invention relates to an apparatus for determining a volume flow with a measuring line through which a fluid can flow and in which are provided measuring devices for determining the fluid flow rate and the degree of filling of the measuring line as well as an evaluating device for determining the volume flow.

BACKGROUND OF THE INVENTION

A method and apparatus for determining a volume flow are known from applicants' copending German patent application P 42 43 077.1 (laid-open Jun. 24, 1993). In the latter the flow rate and filling level are determined at successive locations in the axial extension of the measuring line and therefore in the flow direction,, because the measuring devices for determining the fluid flow rate and the fill level are arranged in succession In the flow direction. In the case of rapidly changing rate profiles and fill level distributions imprecisions can consequently occur in a measurement.

DE 41 08 138 A1 discloses a volume flow determination apparatus which, for improving the measured result, on dropping below a certain fill level in the measuring line has an electromagnet arrangement specifically optimized for partial fill levels and which is activated in place of an electromagnet arrangement responsible for the operation of the completely filled measuring line.

DE 37 37 607 A1 discloses a volume flow determination method, in which a measured value is determined at different levels and then compared with a reference value and in which the mass of the fluid flowing through is determined batchwise.

SUMMARY OF THE INVENTION

The object of the invention is to provide a measuring method making it possible to accurately determine the volume flow of the medium even when the measuring tube is not completely full, as well as in, the case of liquid permeated by foreign bodies, particularly air-permeated milk, as well as to provide an apparatus for the determination of a volume flow, which ensures an extremely accurate measurement with a particularly simple construction.

From the method standpoint the object is achieved in that the determination of the flow rate and of the degree of filling takes place at the same time and at the same location with respect to the axial extension of the measuring line and that the determination of the degree of filling takes place simultaneously with the flow rate determination in a measuring chamber.

From the apparatus standpoint, this object is achieved in that the measuring device for determining the fluid flow rate and the measuring device for the determination of the degree of filling are positioned in the vicinity of the same cross-sectional plane of the measuring line, so that the measuring device for the degree of filling is integrated into the flow rate measuring device.

Through the determination of the flow rate and the degree of filling at the same time and at the same point with respect to the axial extension of the measuring line, preferably by the simultaneous use of electrodes of magnetic-inductive flowmeter, there is a simultaneous measurement and exact association of the two measured values, so that evaluation errors are avoided.

As a result of the use according to the invention of a single measuring device for the determination of the fluid flow rate and for the determination of the degree of filling and consequently in the vicinity of the same cross-sectional plane of a measuring line, simultaneous measurements are possible and with the apparatus according to the invention there is an avoidance of the prior art time shifts, which result from the flow direction displacement of the two measuring devices. Particularly in the case of rapidly changing rate profiles and distributions of the degree of filling there is an exact association of the two measured values and an extremely high volume flow measurement accuracy is made possible. In addition, the mechanical construction of the apparatus is simplified.

Advantageously the measuring device for determining the fluid flow rate is formed by a magnetic-inductive flowmeter (MIF).

For determining the degree of filling with a conductivity meter, appropriate use is made of the MIF electrodes from which is tapped a voltage signal for the flow rate. Thus, even if the liquid to be measured is permeated by non-conductive bodies, such as e.g. air bubbles, there is a particularly accurate determination of the volume flowing through.

The term "degree of filling" or "fill degree" of the measuring line in this case considers the height or fill level of the fluid in the measuring line, respectively, however without any air bubbles or other non-conductive bodies contained in the fluid.

The combination of the magnetic-inductive flowmeter and the conductivity meter in an integrated measuring cell permits a particularly simple and cost-effective construction of the apparatus. It is particularly advantageous if the measuring cell has two facing electrodes, which are located in a section of the measuring line with a substantially rectangular or square cross-section in such a way that a common surface normal of the electrodes is substantially perpendicular to the field lines of the magnetic-inductive flowmeter. The magnetic-inductive flowmeter can be supplied by a signal source with a low frequency or timed signal for producing a switched or timed d.c. magnetic field having a constant field strength. This magnetic field then induces a speed-dependent measuring voltage into the electrodes and which is preferably fed, to the evaluating device. The use of a time-constant, switched d.c. field has the advantage that eddy currents occur neither in the tube, nor in the liquid, so that more accurate measurements are possible.

It is also advantageous if the electrodes are supplied by a signal source with an a.c. voltage of a constant level and substanially constant frequency. The a.c. voltage is preferably a sinusoidal voltage. It ie particularly advantageous if the frequency of the a.c. voltage is much higher, preferably by three orders of magnitude, than the frequency of the speed-dependent measuring voltage. This leads to a simpler, cleaner separation of the two signals during evaluation. It is particularly advantageous if the frequency of the signal for producing the switched or timed d.c. magnetic field is substantially 15 Hz and the a.c. voltage for determining the conductance is substantially 15 kHz.

According to a preferred further development a signal, which represents the alternating current flowing between the electrodes as a result of the a.c. voltage, is supplied as a measure of the fluid conductivity and therefore as a measure for the degree of filling to the evaluating device. In a preferred embodiment the evaluating device has a filter, which separates from one another the speed-dependent measuring signal and the conductivity-dependent measuring signal.

Apparatus for the galvanic separation or isolation of supply voltages and the measuring signals are provided according to an advantageous further development, which avoids a reciprocal influencing of the signals.

It is particularly advantageous for the temperature compensation of the conductance of the fluid to be measured if in the vicinity of the base of the measuring cell there is a preferably rapidly reacting temperature sensor.

The arrangement of a point electrode on both the bottom and the top of the measuring cell and the supply to said electrodes of a voltage having a frequency differing both from the frequency of the a.c. voltage for conductivity determination and also the frequency of the signal for producing the d.c. magnetic field, makes it possible to carry out an autocalibration procedure.

A construction of the apparatus in which the electrodes are made from corrosion-resistant material is particularly advantageous.

BRIEF DESCRIPTION OF THE DRAWINGS

The invention is described in greater detail hereinafter relative to an embodiment illustrated by the attached Figure which schematically shows an apparatus according to the invention.

DESCRIPTION OF THE PREFERRED EMBODIMENT

The Figure shows schematic construction of an apparatus according to the invention, a measuring line 1 being shown in the cross-section of the measuring plane. The measuring line 1 comprises a tube 11, in which is formed a portion 10 having a rectangular flow cross-section. The rectangular portion 10 has at its two longitudinal sides in each case a flat, rectangular electrode 50, 51, which are in each case electrically insulated with respect to an e.g. metallic, grounded tube 11. On its underside the rectangular portion is formed by a bottom 55 and on its upper side by a top 56. The two electrodes 50, 51, as well as the bottom 55 and top 56 define a cross-sectionally rectangular measuring chamber 12 of conductivity meter 30 in a measuring cell 5.

A temperature sensor 54 fitted in the vicinity of the base 53 of the measuring chamber 12, e.g. below the bottom 55 or forming the bottom 55, in the represented embodiment is part of the measuring cell 5 in the same way as a point electrode 57 located in the bottom 55 and a point electrode 58 located in the top 56. The point electrodes 57, 58 make it possible, particularly during suction processes from containers, to carry out an autocalibration procedure whenever the tube is completely filled for the first time. The rapidly reacting, flat temperature sensor 54 is used for compensating the temperature influence during the determination of the conductance of a known fluid flowing through the measuring chamber. The temperature sensor 54 can be simultaneously used for the temperature compensation of the volume flowmeter.

The rectangular measuring chamber 12 with the flat, vertically positioned electrodes 50, 51 is simultaneously operated as a magnetic-inductive flowmeter 20 (MIF), which has an e.g. U-shaped electromagnet 21, the free legs 22, 23 of the U-shaped yoke of the electromagnet 21 being located above and below the measuring chamber 12 or the measuring cell 5. A coil 24 in the central portion of the electromagnet 21 energizes the latter in such a way that a magnetic field is formed between the two legs 22 and 23 whose field lines extend substantially vertically, i.e. parallel to the surface of the electrodes 50, 51 and therefore at right angles to a normal surface 52 common to these electrodes.

A common voltage supply 6 supplies a first galvanic isolator 60 and a second galvanic isolator 61 with voltage. The first isolator 60 is used for the voltage supply of the fill degree measuring device 3. The second isolator 61 is used for the voltage supply of the flow rate measuring device 2 which, as described hereinbefore, has a magnetic-inductive flowmeter. An electric isolation prevents the reciprocal influencing of the signals used for fill degree determination and volume flow measurement.

An electronic control 62 for the magnetic field of the electro-magnet 21 supplied with voltage by the second isolator provides an electric signal, preferably of a low frequency a.c. voltage of e.g. 15 Hz to the coil 24 of the electromagnet 21. As a result d.c. voltage effects are eliminated, whilst avoiding deposits on electrodes and migration effects. Fundamentally it is also possible to use a timed d.c. voltage for operating the magnet. As a result the magnetic field homogeneously propagated parallel to the electrodes is produced with a constant field strength. If a conductive liquid now flows through the measuring chamber 12, then the magnetic field induces at the electrodes 50, 51 a speed-dependent voltage, which is in the millivolt or microvolt range and from the frequency standpoint follows the magnetic field applied. This voltage is tapped at the electrodes 50, 51 and supplied to a filter stage 25, in which the low frequency measuring signal of the magnetic-inductive flowmeter is filtered from the overall signal applied to the electrodes. The filtered out measuring signal of the magnetic-inductive flowmeter is then supplied to an electronic evaluation device 26, in which a signal reproducing the flow rate is produced or, taking account of the cross-sectional surface of the measuring cell, the volume flow. This signal is then supplied to an output-side isoletor 27, which transfers this signal to an evaluating device 4.

The first voltage supply isolator 60 supplies a voltage signal to a signal generator 63, which generates a high frequency sinusoidal voltage and delivers it to the electrodes 50, 51. The high frequency a.c. voltage, preferably around 15 kHz, applied to the electrode 50, 51 gives rise to a current flow within the fluid flowing through the measuring chamber 12, which current flow is dependent on the conductivity of the fluid. The current level is measured in the signal generator 63 and supplied to an evaluating electronics 32 for determining the fill degree signal. The fill degree signal determined in the evaluating electronics 32 is then fed via an isolator 33 to the evaluating device 4. As the signals emanating from the magnetic-inductive flowmeter are much smaller than the fill degree signals, the latter are only influenced to a minimum, negligible extent, so that there is no need for a filtering here. The temperature signal determined by the temperature sensor 54 is also supplied to the evaluating device 4.

The sinusoidal voltage applied to the electrodes 50, 51 by the signal generator 63 has a constant level and an almost constant frequency, said frequency being much higher than the measuring frequency of the speed-dependent measuring voltage. The alternating current, which arises as a result of the a.c. voltage applied to the electrodes, is a measure for the conductance of the fluid and consequently permits, with the knowledge of e calibration value, conclusions to be drawn regarding the fill degree within the measuring chamber 12. The higher the conductance of the fluid, the higher the fill degree of the conductive fluid in the measuring chamber. Inclusions of non-conductive material in the conductive fluid, e.g. air in milk, lower the conductance and therefore supply a signal for a lower fill degree.

The product of the fill degree and the flow volume is then formed in the evaluating device 4 and from this is obtained the actual volume flow of the conductive fluid. The voltage induced by the magnetic field is, according to Fareday's law, dependent on the strength of the magnetic field, the tube cross-section, as well as an apparatus constant and the average speed of the through-flowing fluid. However, an error source can e.g. be represented by the fact that the fluid to be measured is permeated by non-conductive bodies (e.g. air bubbles) or through the tube not being completely filled. These errors can e.g. occur during the suction of fluid from an almost empty container, when air suction also takes place. Therefore when determining the volume flow additionally and simultaneously within an integrated device, particularly with the electrodes of a MIF, the actual fill degree of the tube in the vicinity of the measuring cell is measured and taken into account.

As has already been stated, the measuring chamber 12 is rectangular or square and the rectangular electrodes 50, 51 covert substantially the entire cross-section of the measuring chamber 12, so that small fill degrees can also be determined and simultaneously the flow pattern is not impaired. In order to construct the rectangular or square measuring chamber 12 within the tube 11, the flow cross-section upstream of the measuring chamber must narrow from the circular cross-section of the tube 11 to the rectangular or square cross-section of the measuring chamber and then widen again. The narrowing and widening are so flow-designed, that there is no additional turbulence, which could unfavourably influence the measurement. The electrodes 50, 51 are positioned in such a way that they do not significantly influence the flow in a detrimental manner. The electrodes are made from corrosion-resistant material.

As a result of the flat construction of the electrodes 50, 51 measuring errors are prevented which can occur in the case of point electrodes because the latter are covered by air bubbles. Any air bubbles occurring in individual form on the surface of the electrodes 50, 51 cannot influence the measurements as a result of the relatively large surface of the electrodes 50, 51.

The tube 11, top 56 and bottom 55 are preferably made from magnetically non-conductive material.

We claim:

1. A method for determining volume flow of a fluid which passes through a tubular measuring line having a defined cross-section, comprising:

determining flow rate of the fluid using flat electrodes of a magnetic-inductive flowmeter;

supplying a coil of an electromagnet of the magnetic-inductive flowmeter with a low frequency or timed signal for producing a switched or timed d.c. or a.c. magnetic field with a constant field strength, and for thereby inducing a speed-dependent measuring voltage at the electrodes (50, 51);

simultaneously supplying the electrodes with an a.c. voltage of constant level and substantially constant frequency, wherein frequency of the a.c. voltage is significantly higher than frequency of the speed-dependent measuring voltage; and applying the speed-dependent measuring voltage and a conductivity-dependent measuring signal which represents alternating current flowing as a result of the a.c. voltage between the electrodes to an evaluating device as a measure of fluid conductivity and as a measure of a degree of filling of the measuring line.

2. An apparatus for determining a volume flow within a tubular measuring line through which a fluid flows comprising:

a magnetic-inductive flowmeter as a measuring device for determining flow rate of the fluid, said flowmeter comprising a measuring chamber in said tubular measuring line having flat electrodes facing one another, wherein a coil (24) of an electromagnet of the magnetic-inductive flowmeter is supplied by a signal source with a low frequency or timed signal for producing a switched or timed d.c. or a.c. magnetic field with a constant field strength, said magnetic field inducing a speed-dependent measuring voltage at the electrodes which is passed to an evaluating device, wherein simultaneously the electrodes are supplied by a signal source with an a.c. voltage of constant level and substantially constant frequency and wherein a conductivity-dependent measuring signal, which represents alternating current which as a result of the a.c. voltage flows between the electrodes is applied to the evaluating device as a measure of fluid conductivity and as a measure of a degree of filling of the measuring line.

3. An apparatus according to claim 2, wherein the a.c. voltage is a sinusoidal voltage.

4. An apparatus according to claim 2, wherein frequency of the a.c. voltage is significantly higher than frequency of the speed-dependent measuring voltage.

5. An apparatus according to claim 4, wherein the frequency of the signal for producing the d.c. magnetic field is about 15 Hz and the frequency of the a.c. voltage for determining the conductivity is about 15 kHz.

6. An apparatus according to claim 4 wherein the frequency of the a.c. voltage is higher by three degrees of magnitude than the frequency of the speed-dependent measuring voltage.

7. An apparatus according to claim 2, wherein the flat electrodes facing one another are arranged in the measuring chamber which has a rectangular cross-section and a surface normal to the electrodes runs substantially perpendicularly to field lines of the magnetic-inductive flowmeter.

8. An apparatus according to claim 7, wherein a temperature sensor is provided in a bottom portion of the measuring chamber.

9. An apparatus according to claim 8, wherein a point electrode is provided on both the bottom portion and a top portion of the measuring chamber which can be supplied with a voltage, which has a frequency which differs both from the frequency of the a.c. voltage for conductivity determination and from the frequency of the signal for producing the d.c. magnetic field.

10. An apparatus according to claim 2, wherein at least one filter (25) is provided which separates the speed-dependent measuring voltage and the conductivity-dependent measuring signal from one another.

11. An apparatus according to claim 2, wherein the flat electrodes are substantially planar electrodes which cover a cross-section of the measuring chamber and are made from a corrosion-resistant material.

12. An apparatus according to claim 2, wherein the cross-section of the tubular measuring line narrows from a substantially circular cross-section upstream of the measuring chamber to a rectangular or square cross-section in the measuring chamber, so that the flow rate in the measuring chamber is greater than the flow rate in the substantially circular cross-section portion of the tube.

13. An apparatus according to claim 2, further comprising devices (60, 61) for galvanic isolation of a common voltage supply (6) from a fill degree measuring device (3) and the magnetic-inductive flowmeter (2), respectively.

14. An apparatus according to claim 2, further comprising devices (33, 27) for galvanic isolation of an evaluating device (4) from a fill degree measuring device (3) and the magnetic-inductive flowmeter (2), respectively.

* * * * *